(12) United States Patent
Khatri et al.

(10) Patent No.: US 8,127,296 B2
(45) Date of Patent: Feb. 28, 2012

(54) VIRTUAL MACHINE MIGRATION BETWEEN PROCESSORS HAVING VM MIGRATION REGISTERS CONTROLLED BY FIRMWARE TO MODIFY THE REPORTING OF COMMON PROCESSOR FEATURE SETS TO SUPPORT THE MIGRATION

(75) Inventors: Mukund Khatri, Austin, TX (US);
Robert Hormuth, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 1202 days.

(21) Appl. No.: 11/850,946

(22) Filed: Sep. 6, 2007

(65) Prior Publication Data
US 2009/0070760 A1    Mar. 12, 2009

(51) Int. Cl.
G06F 9/46 (2006.01)
G06F 15/173 (2006.01)
G06F 9/445 (2006.01)
G06F 15/76 (2006.01)

(52) U.S. Cl. .......... 718/104; 709/226; 717/171; 712/43
(58) Field of Classification Search .............. None
See application file for complete search history.

(56) References Cited

U.S. PATENT DOCUMENTS

| | | | |
|---|---|---|---|
| 6,698,017 B1 | 2/2004 | Adamovits et al. | 717/168 |
| 6,701,333 B2 | 3/2004 | Suermondt et al. | 707/204 |
| 6,854,115 B1 | 2/2005 | Traversat et al. | 718/1 |
| 6,941,410 B1 | 9/2005 | Traversat et al. | 711/6 |
| 7,065,549 B2 | 6/2006 | Sun et al. | 709/201 |
| 7,103,529 B2 * | 9/2006 | Zimmer | 703/27 |
| 7,203,944 B1 | 4/2007 | van Rietschote et al. | 718/104 |
| 7,210,147 B1 | 4/2007 | Hipp et al. | 719/312 |
| 7,257,811 B2 | 8/2007 | Hunt et al. | 718/1 |
| 2006/0069761 A1 | 3/2006 | Singh et al. | |
| 2006/0195715 A1 | 8/2006 | Herington | |
| 2006/0218544 A1 * | 9/2006 | Chakraborty et al. | 717/168 |
| 2006/0230407 A1 | 10/2006 | Rosu et al. | |
| 2007/0271560 A1 * | 11/2007 | Wahlert et al. | 718/1 |
| 2008/0168258 A1 * | 7/2008 | Armstrong et al. | 712/43 |
| 2008/0235378 A1 * | 9/2008 | Fried et al. | 709/226 |

OTHER PUBLICATIONS

Written Opinion and Search Report for Singapore Patent Application No. 200806421-4, May 28, 2009.

* cited by examiner

*Primary Examiner* — Meng An
*Assistant Examiner* — Bing Zhao
(74) *Attorney, Agent, or Firm* — Hamilton & Terrile, LLP; Stephen A. Terrile

(57) ABSTRACT

A system and method for performing a VM migration which manages a cluster of machines in a pool for live migration to the same feature set or behavior. In certain embodiments, machines within the pool can be configured to emulate a certain feature set to enable a VM migration amongst the similar pools. The emulation can be by either masking reporting of a feature set or enabling/disabling a feature set. The handling of emulation registers within the hardware occurs at a firmware level rather than an operating system or hypervisor level.

9 Claims, 4 Drawing Sheets

VIRTUAL MACHINE MIGRATION BETWEEN PROCESSORS HAVING VM MIGRATION REGISTERS CONTROLLED BY FIRMWARE TO MODIFY THE REPORTING OF COMMON PROCESSOR FEATURE SETS TO SUPPORT THE MIGRATION

BACKGROUND OF THE INVENTION

1. Field of the Invention

The present invention relates to information handling systems and more particularly to virtual machine (VM) migration between processor architectures.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue that relates to information handling systems is virtualization, which refers to the abstraction of information handing system resources. More specifically, virtualization hides physical characteristics of information handling system resources from the way in which other systems, applications, or end users interact with those resources. Virtualization includes making a single physical resource (such as a server, an operating system, an application, or storage device) appear to function as multiple logical resources; or making multiple physical resources (such as storage devices or servers) appear as a single logical resource.

Virtualization is especially prevalent in an enterprise information handing system environment. It is often desirable to use virtualization when performing a VM migration (i.e., moving one virtual machine from one system (logical or physical) to another system). However, with VM migration, especially live VM migration (i.e., when a VM is executing on one system is migrated over to another system where the process of migration is without the system being in a shut down or suspend state), an architectural issue between different CPU vendors and even between generations of products from the same vendor can present itself. This architectural issue is often caused by different features between vendors and between generations of the same vendor. Thus, for example, an issue is presented when attempting to migrate a live Virtual Machine that is executing supplemental streaming extensions, version 4 (SSE4) to a system that is only capable of supporting SSE, version 3 (SSE3) and does not support SSE4 instructions. The VM migration issue can also be present when the VM that is being migrated is not in a live state (e.g., either is operating in a shut down or suspend state).

The issue presents itself when an application loads and executes a processor identification (e.g., a CPUID) instruction. This instruction returns a processor identifier (ID) and feature information. An application uses this information to set which path to take based on the features and instruction set of the given CPU. Examples of CPUID instruction and results can be found in "Intel® 64 and IA-32 Architectures Software Developer's Manual—Volume 2A—Instruction Set Reference, A-M". When an application is live and executing to a given instruction set and/or feature set, live migration between systems can only occur if the target system has the same feature support as the source system. For example, FIG. 1, labeled Prior Art, shows a flow chart of an example program load.

Another issue relating to VM migration can be present when an application program that does not issue a processor identification instruction to make code path decisions. In this situation, the application does not have knowledge of the complete processor instruction and feature set.

SUMMARY OF THE INVENTION

In accordance with the present invention, a method for performing a VM migration is presented which manages a cluster of machines in a pool for live migration of a feature set or behavior from one virtual machine to another virtual machine. In certain embodiments, machines within the pool can be configured to emulate a certain feature set to enable a VM migration amongst the similar pools. The emulation can be by either masking reporting of a feature set or enabling/disabling a feature set. The handling of emulation registers within the hardware (i.e., the manipulation of the feature set when operating in the emulation mode) occurs at a firmware (e.g., a basic input output system (BIOS)) level rather than an operating system or hypervisor level.

More specifically, in one embodiment, the invention relates to a method for performing virtual machine migration between a plurality of information handling systems. The method includes identifying processors within the plurality of information handling systems having a common feature set, the common feature set comprising instruction set level compatibility; pooling information handling systems having processors with the common feature set to provide a pool of similar information handling systems; and performing a virtual machine migration from a first information handling system to an information handling system within the pool of similar information handling systems, the virtual machine migration moving one virtual machine from a information handling system to another information handling system.

In another embodiment, the invention relates to an apparatus for performing virtual machine migration between a plurality of information handling systems. The apparatus includes means for identifying processors within the plurality of information handling systems having a common feature set, the common feature set comprising instruction set level compatibility; means for pooling information handling systems having processors with the common feature set to provide a pool of similar information handling systems; and means for performing a virtual machine migration from a first information handling system to an information handling system within the pool of similar information handling systems, the virtual machine migration moving a virtual machine from one information handling system to another information handling system.

In another embodiment, the invention relates to an information technology environment that includes a plurality of information handling systems as well as a system for performing virtual machine migration between the plurality of information handling systems. Each of the plurality of information handling systems includes a processor and, memory coupled to the processor. The system for performing virtual machine migration includes instructions executable by a processor for identifying processors within the plurality of information handling systems having a common feature set, the common feature set comprising instruction set level compatibility; pooling information handling systems having processors with the common feature set to provide a pool of similar information handling systems; and performing a virtual machine migration from a first information handling system to an information handling system within the pool of similar information handling systems, the virtual machine migration moving a virtual machine from one information handling system to another information handling system.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
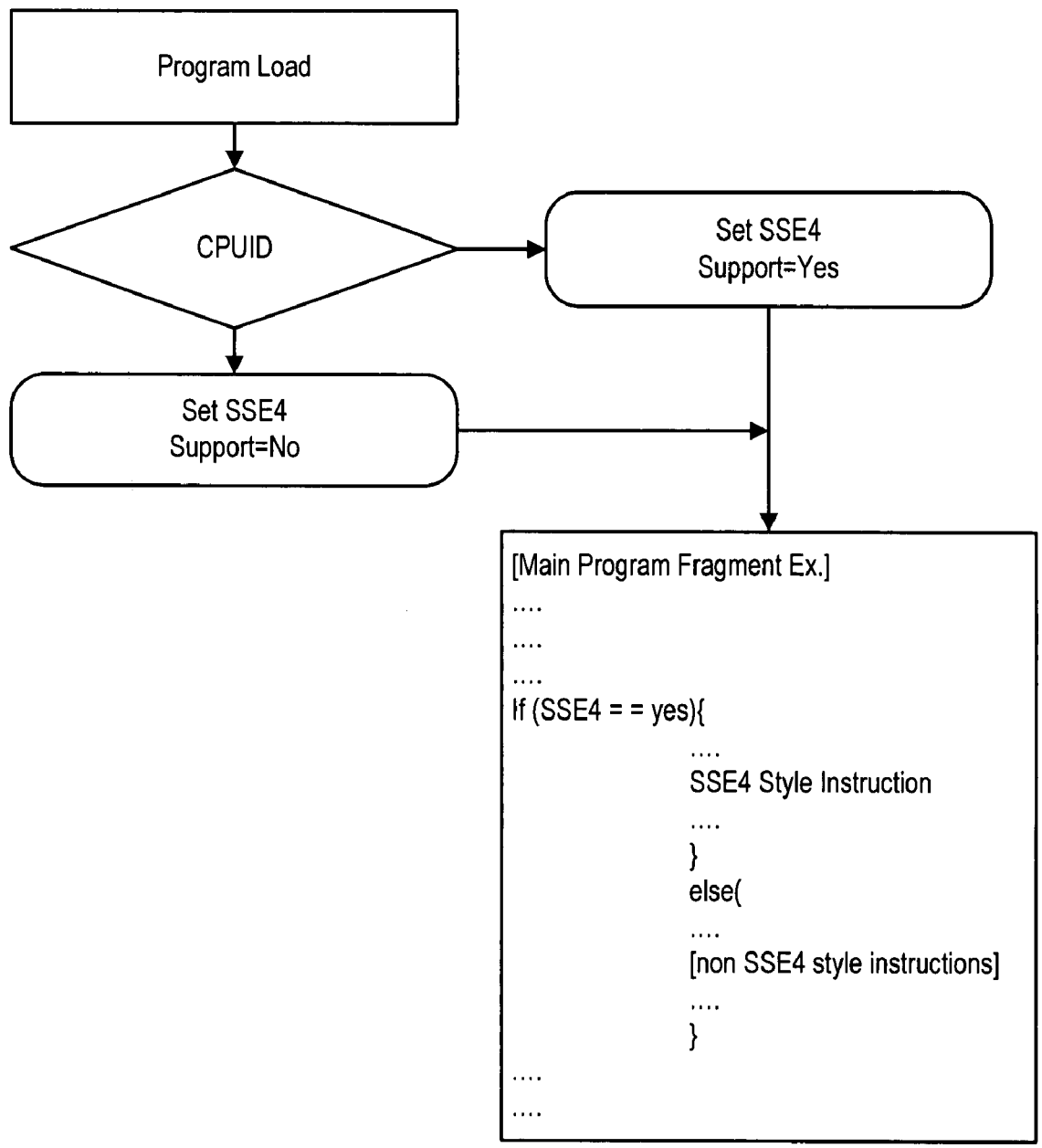
FIG. 1, labeled Prior Art, shows a flow chart of an example program load.
Figure 2:
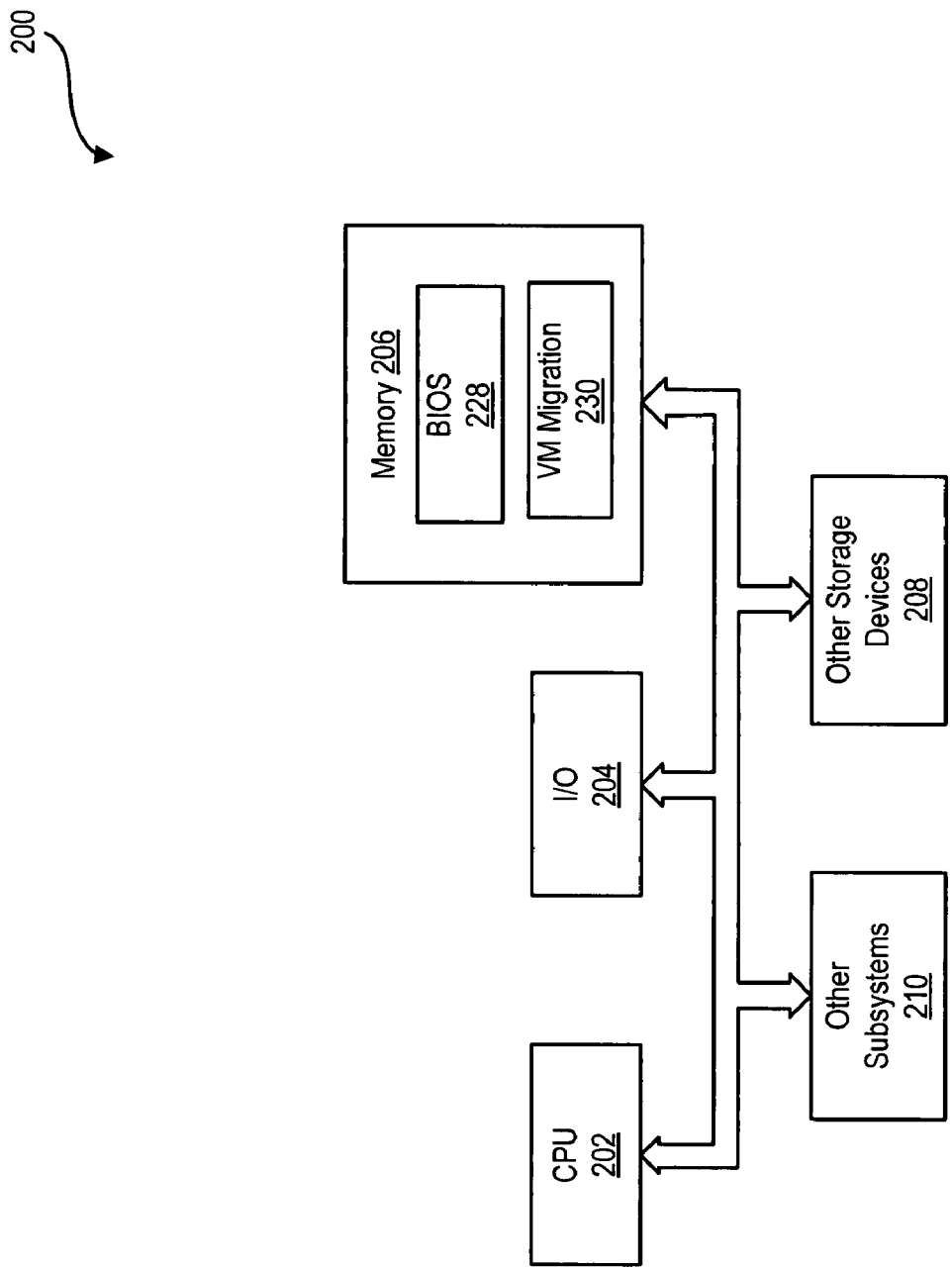
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers, memory 206, including volatile memory such as random access memory (RAM) and non-volatile memory such as read only memory (ROM) and hard disk drives, and other storage devices 208, such as a floppy disk and drive or CD-ROM disk and drive, and various other subsystems 210, all interconnected via one or more buses 212. The memory 206 includes a basic input output system (BIOS) 228 as well as a VM migration module 230.

The VM migration module 230 enables performing a VM migration is presented which manages a cluster of machines in a pool for live migration to the same feature set or behavior. In certain embodiments, machines within the pool can be configured to emulate a certain feature set to enable a VM migration amongst the similar pools. The emulation can be by either masking reporting of a feature set or enabling/disabling a feature set. The handling of emulation registers within the hardware (i.e., the manipulation of hardware registers of the feature set when operating in the emulation mode) occurs at a firmware level (such as via the BIOS) rather than an operating system or hypervisor level.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
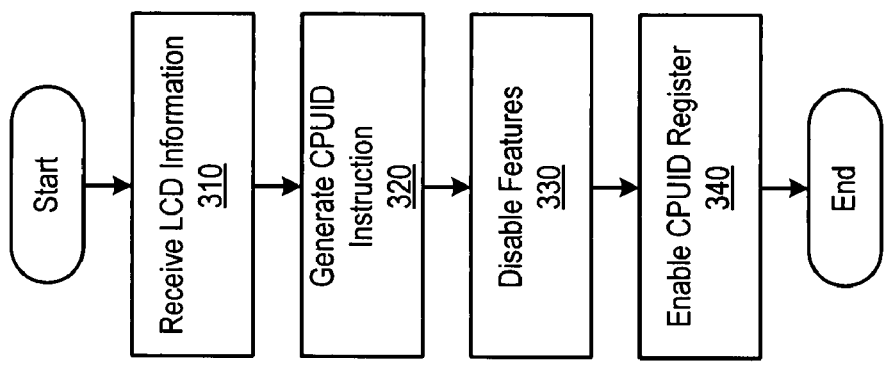
FIG. 3 shows a flow chart of the operation of the BIOS.

Referring to FIG. 3, a flow chart of the operation of the BIOS is shown. Each information handling system processor 202 includes VM migration registers that the BIOS 228 can manipulate. Within these registers are disable (or masking) features storage locations. The processor 202 uses these storage locations for various features that are exposed to software. Additionally, the processor 202 of each system includes a Virtual CPUID (vCPUID) field to return the CPUID, as well as other resource information such as stepping family information. When the BIOS 228 sets these fields, the BIOS 228 also sets a model specific register (MSR) which causes the VM migration registers to return modified data upon receipt of the CPUID instruction. The MSRs thus function as control registers which provide the BIOS with information relating to the specific processor implementation.

Thus, when the BIOS 228 starts executing, an Baseboard Management Controller-Service Processor (BMC) (or some other application program interface (API) which could bypass the BMC) provides the BIOS 228 with Least Common Denominator (LCD) information at step 310. Next, the BIOS 228 generates processor identification instruction (such as e.g., a CPUID instruction) and saves the results in within a scratch memory at step 320. Next, the BIOS 228 on each information handling system uses Least Common Denominator input to disable features in hardware and sets the Virtual CPUID field accordingly at step 330. Next, the BIOS 228 optionally sets a bit in the MSR to enable usage of the Virtual CPUID register as well as the features identified within the virtual CPUID register. The BIOS 228 then signals the BMC to complete to allow out of band communication if needed at step 340. Accordingly, the processor within the system is configured to the same features as the Least Common Denominator. Additionally, the CPU ID/Family/Stepping information is set to allow live migration to occur without running into architectural boundaries. This operation may be performed on a system by system basis or across a pool of systems via a common API.

Figure 4:
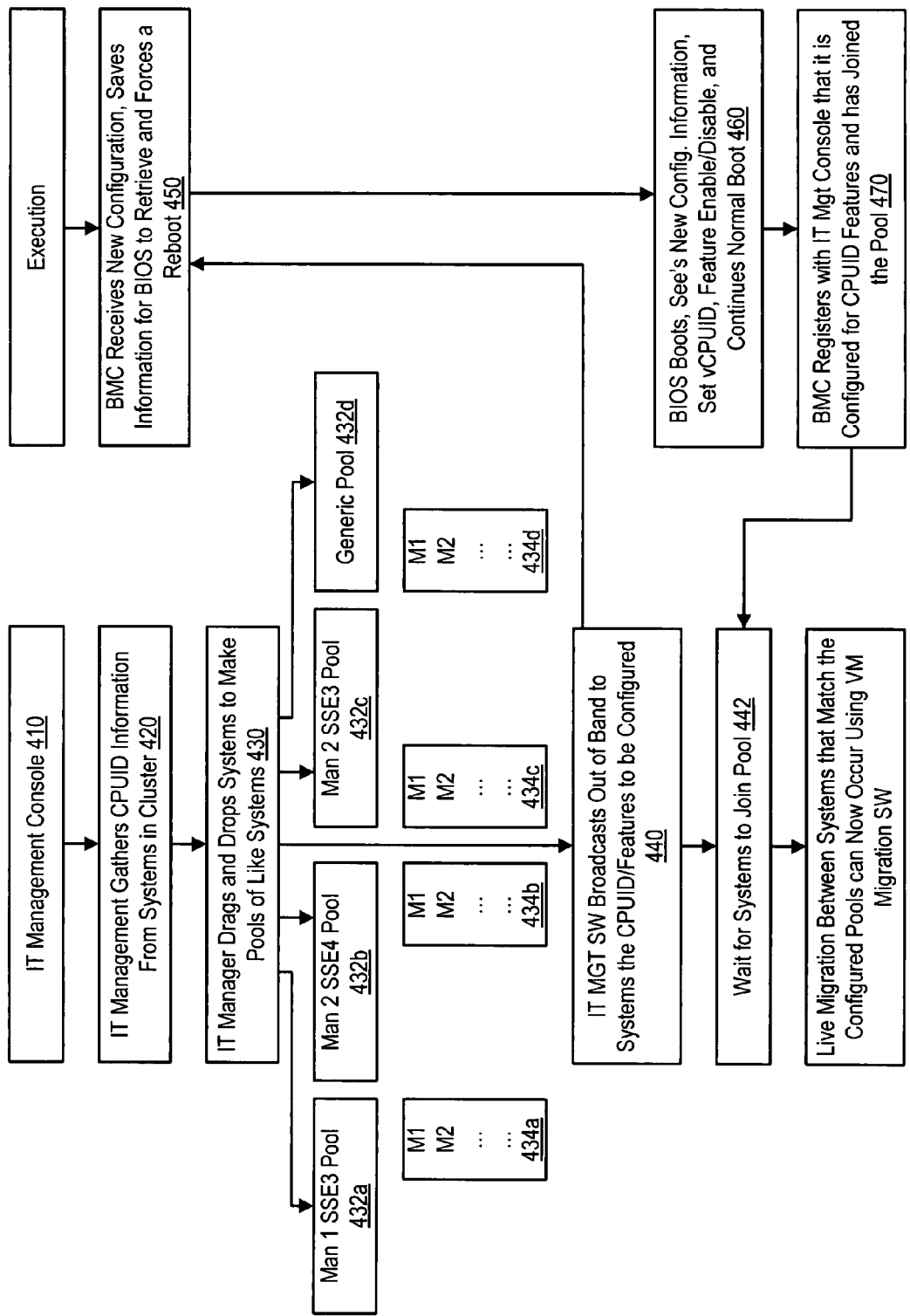
FIG. 4 shows a flow chart of the operation of a system for performing a VM migration.

Referring to FIG. 4, a flow chart of the operation of a VM migration is shown. In general, the system for performing a VM migration performs a hardware feature disablement and virtual CPUID manipulation operation using BIOS 228. The system for performing VM migration 230 is executed by an information technology (IT) management application 410.

More specifically, the IT management application 410 gathers the CPUID information for systems within a cluster of systems for which it is desired to perform a VM migration at step 420. The common systems are then pooled, either automatically or manually. E.g., in certain embodiments, an IT manager (or some other user operating the IT Management application 410) symbolically pools (e.g., by dragging and dropping) systems to identify pools of like systems (i.e., systems to conform to a certain least common denominator)

at step 430. For example, a pool might include a first manufacturer SSE3 Pool 432a, a first manufacturer SSE4 Pool 432b, a second manufacturer SSE3 pool 432c, and a generic manufacturer pool 432d. Each pool includes a corresponding identification 434.

Next, the system for performing a VM migration 230 broadcasts to out of band systems (and optionally inband systems) the features corresponding to each of the pools at step 440. The system then waits on the out of band systems to identify to which pool each system should be associated at step 442. A live migration between systems that match each of the configured pools can now occur using any VM migration software at step 444.

In each of the executing systems, the BMC receives the new configuration for the VM migration and saves the information within the system's BIOS domain to retrieve during a reboot operation at step 450. When the BIOS first loads on each of the systems upon reboot, the BIOS 228 directly masks dissimilarities in the feature set in the respective system along by setting a virtual migration field (e.g., a vCPUID field), when available, at step 460. Thus, when the CPUID instruction is executed, each of the systems returns with features enabled/disabled by the BIOS and with whatever CPUID the IT management application set. The BMC then registers the system with the IT management application at step 470. The registration includes information that the system is configured for a particular CPU ID having certain features and that the system has joined a particular pool of systems.

Thus, the system for performing a VM migration allows crossing of processor architecture boundaries by allowing an IT manager to bring the pool down to any processor compatible level (i.e., to any least common denominator) such as any x86 compatible level.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, in another embodiment, a hypervisor binary translation might be used to perform the VM migration. More specifically, when a pool of systems are identified, the IT management software determines lowest common denominator feature set and broadcasts this feature set to a hypervisor executing on each system. When an application program is being loaded onto a system, the hypervisor performs a Binary Translation of the program. I.e., the hypervisor searches for the CPUID instruction and replaces with an alternate execution path which results in a desired return value of the CPUID instruction to spoof the application. Thus, all machines in the cluster appear to execute with the same features set.

For example, the original code might be

```
..... MOV EAX, INPUT
CPUID
[code that uses return flags to set code execution paths]
.....
```

Whereas the modified code would be:

```
....
MOV EAX, INPUT
JMP [CPUID_replacement_function] Jumping to an Alternate Routine
[code that uses return flags to set code execution paths]
.....
: CPUID_replacement_function
/* save input variable */
CPUID_function_call_input = EAX;
/* input from cluster mgmt */
HYPERVISOR_common_denominator = XYZ;
/* perform original CPUID to get CPU features */
MOV EAX, CPUID_function_call_input ; CPUID
[Set EAX, EBX, ECX, EDX...according to
HYPERVISOR_common_denominator ]
Return;
```

Also for example, in another embodiment, CPUID Trap operation might be used when performing the VM migration. More specifically, the Trap operation traps the result of the CPUID instruction. A handler within the BIOS 228 then performs a binary translation operation.

For example, with the TRAP operation, a sample instruction flow might be as follows:

```
MOV EAX, INPUT
CPUID
[code that uses return flags to set code execution paths]
```

Whereas the modified code which includes the trap feature would be:

```
MOV EAX, INPUT
CPUID /* runs and populates EAX, EBX, ECX, EDX */
TRAP HANDLER
[Set EAX, EBX, ECX, EDX...according to
HYPERVISOR_common_denominator ]
Return;
[code that uses return flags to set code execution paths]
```

To support this mode the processor is to allow the CPUID instruction to enable an exception event and assigns a vector location for the handler. Upon receipt of the exception event, the processor transfers to the vector location for the handler. This method is different from a VM_EXIT operation where virtualization technology (VT) enabled processors because not all processors are VT enabled, trying to pass the common denominator to the hypervisor in-band adds complexity to the management plane (adding another plane) versus simply doing it in the existing out of band management plane via BIOS, allowing CPUID trap allows other uses outside a virtualized and managed environment where an end user may want to change the feature set of a given system to allow a particular program to execute, and requires less processor logic changes to spoof an application.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for performing virtual machine migration between a plurality of information handling systems comprising:
    identifying processors within the plurality of information handling systems having a common feature set, the common feature set comprising instruction set level compatibility, at least some of the processors corresponding to respective information handling systems;
    pooling information handling systems having processors with the common feature set to provide a pool of similar information handling systems; and
    performing a virtual machine migration from a first information handling system to an information handling system within the pool of similar information handling systems; and wherein
    the common feature set comprises at least one of a common processor manufacturer, a common processor generation and a common instruction set; and,
    each of the processors comprise virtual machine migration registers, the virtual machine migration registers being controlled by firmware of the information handling system to modify the reporting of features within the processor, the modifying the reporting of features facilitating identification of a common feature set.

2. The method of claim 1 wherein the identifying further comprises
    performing a processor identification operation on each of the processors, the processor identification operation returning processor identification data for each of the processors.

3. The method of claim 1 wherein:
    the virtual machine migration registers cause the processor to report modified identification data in response to a processor identification operation.

4. An apparatus having a processor for performing virtual machine migration between a plurality of information handling systems comprising:
    means for identifying processors within the plurality of information handling systems having a common feature set, the common feature set comprising instruction set level compatibility, at least some of the processors corresponding to respective information handling systems;
    means for pooling information handling systems having processors with the common feature set to provide a pool of similar information handling systems; and
    means for performing a virtual machine migration from a first information handling system to an information handling system within the pool of similar information handling systems; and wherein
    the common feature set comprises at least one of a common processor manufacturer, a common processor generation and a common instruction set; and,
    each of the processors comprise virtual machine migration registers, the virtual machine migration registers being controlled by firmware of the information handling system to modify the reporting of features within the processor, the modifying the reporting of features facilitating identification of a common feature set.

5. The apparatus of claim 4 wherein the means for identifying further comprises
    means for performing a processor identification operation on each of the processors, the processor identification operation returning processor identification data for each of the processors.

6. The system of claim 4 wherein:
    the virtual machine migration registers cause the processor to report modified identification data in response to a processor identification operation.

7. An information technology environment comprising:
    a plurality of information handling systems, each of the plurality of information handling systems comprising
        a processor; and,
    memory coupled to the processor;
    a system for performing virtual machine migration between the plurality of information handling systems, the system for performing virtual machine migration comprising instructions executable by a processor for:
    identifying processors within the plurality of information handling systems having a common feature set, the common feature set comprising instruction set level compatibility, at least some of the processors corresponding to respective information handling systems;
    pooling information handling systems having processors with the common feature set to provide a pool of similar information handling systems; and
    performing a virtual machine migration from a first information handling system to an information handling system within the pool of similar information handling systems; and wherein
    the common feature set comprises at least one of a common processor manufacturer, a common processor generation and a common instruction set; and,
    each of the processors comprise virtual machine migration registers, the virtual machine migration registers being controlled by firmware of the information handling system to modify the reporting of features within the processor, the modifying the reporting of features facilitating identification of a common feature set.

8. The information technology environment of claim 7 wherein the instructions for identifying further comprise instructions for:
    performing a processor identification operation on each of the processors, the processor identification operation returning processor identification data for each of the processors.

9. The information technology environment of claim 7 wherein:
    the virtual machine migration registers cause the processor to report modified identification data in response to a processor identification operation.

* * * * *